(12) United States Patent  (10) Patent No.: US 8,532,661 B2
Vikberg et al.  (45) Date of Patent:  Sep. 10, 2013

(54) NETWORK GATEWAY CONFIGURED TO PROVIDE A HANDOVER, CONVERTING AND ROUTING FUNCTION

(75) Inventors: Jari Vikberg, Järna (SE); Thomas Lindqvist, Mölndal (SE); Tomas Nylander, Värmdö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 121 days.

(21) Appl. No.: 13/130,079

(22) PCT Filed: May 13, 2009

(86) PCT No.: PCT/SE2009/050535
§ 371 (c)(1),
(2), (4) Date: May 19, 2011

(87) PCT Pub. No.: WO2010/059099
PCT Pub. Date: May 27, 2010

(65) Prior Publication Data
US 2011/0223919 A1  Sep. 15, 2011

Related U.S. Application Data

(60) Provisional application No. 61/116,769, filed on Nov. 21, 2008.

(51) Int. Cl.
*H04W 36/00* (2009.01)
(52) U.S. Cl.
USPC .......................................... 455/436; 455/438
(58) Field of Classification Search
USPC .................. 455/436, 438; 370/331
See application file for complete search history.

(56) References Cited

U.S. PATENT DOCUMENTS
2008/0261602 A1  10/2008  Livneh

OTHER PUBLICATIONS

International Search Report for PCT/SE2009/050535, dated Feb. 9, 2009.
Written Opinion of the International Searching Authority for PCT/SE2009/050535, dated Feb. 9, 2009.
International Preliminary Report on Patentability for PCT/SE2009/050535 dated Mar. 8, 2011.
Mitsubishi Electric: "EUTRAN Proxy in support of massive deployment of HNBs," 3GPP Draft; R3-080062 (HNB Proxy), $3^{rd}$ Generation Partnership Project (3GPP), Mobile Competence Centre; 650, Route Des Lucioles,; F-06921 Sophia-Antipolis Cedex; France, vol. RAN WG3, No. Sorrento, Italy, 20080211, Feb. 4, 2008.

(Continued)

*Primary Examiner* — Sam Bhattacharya
(74) *Attorney, Agent, or Firm* — Myers Bigel Sibley & Sajovec (57) ABSTRACT

Methods are provided for handing over a connection from a source base station to a target base station. The methods include receiving, at a gateway, a handover required message transmitted from the source base station, the handover required message indicating that a user equipment-connection serviced by the source base station should be handed over to a target base station; generating, at the gateway, a handover request message in response to receiving the handover required message; and transmitting, from the gateway, to the target base station the handover request message. The gateway acts as a proxy of a core network control node for a plurality of base stations that are connected to the gateway. Related devices are also provided herein.

27 Claims, 4 Drawing Sheets

(56) References Cited

OTHER PUBLICATIONS

Nokia Siemens Networks et al., "Impact on S1AP from HeNB GW concept," 3GPP Draft; R3-080465, 3$^{rd}$ Generation Partnership Project (3GPP), Mobile Competence Centre; 650, Route Des Lucioles; F-06921 Sophia-Antipolis Cedex, Frane, vol. RAN WG3, No. Sorrenta, Italy, 20080211, Feb. 14, 2008.

"Universal Mobile Telecommunications System (UMTS) Evolved Universal Terrestrial Radio Access (E-UTRA) and Evolved Universal Terrestrial Radio Access Network (E-UTRAN); Overall description; Stage 2 (3GPP TS 36.300 version 8.6.0 Release 8); ETSI TS 136 300" ETSI Standard, European Telecommunications Standards Institute (ETSI), Sophia Antipolis Cedex, France, vol. 3-R2, No. V8.6.0, Oct. 1, 2008.

3GPP TSG-RAN WG3 #61, Jeju Island, Korea, Aug. 18-22, 2008, 3 pages.

3GPP TSG-RAN3 #61 bis, Prague, Czech Republic, Sep. 30-Oct. 3, 2008, 4 pages.

3GPP TSG-RAN3 #62, Prague, Czech Republic, Nov. 10-14, 2008, 4 pages.

NETWORK GATEWAY CONFIGURED TO PROVIDE A HANDOVER, CONVERTING AND ROUTING FUNCTION

CROSS-REFERENCE TO RELATED APPLICATIONS

This application is a 35 U.S.C. §371 national stage application of PCT International Application No. PCT/SE2009/050535, filed on May 13, 2009, which claims the benefit of U.S. Provisional Application No. 61/116,769, filed on Nov. 21, 2008, the disclosures and contents of which are incorporated by reference herein as if set forth in their entireties. The above-referenced PCT International Application was published in the English language as International Publication No. WO 2010/059099 on May 27, 2010.

TECHNICAL FIELD

The present invention relates to radio communications. In one aspect, the invention relates to a network gateway configured to provide a handover, converting and routing function.

BACKGROUND

Specifications for the next generation radio access network (RAN) are currently being developed by the 3rd Generation Partnership Project (3GPP). This so-called next generation RAN is referred to as the "Evolved Universal Terrestrial Radio Access Network (E-UTRAN)". Another name for E-UTRAN is the "Long Term Evolution (LTE)" RAN.

The LTE RAN is designed to be connected to a core network (CN), which is called the "Evolved Packet Core (EPC) network" or "System Architecture Evolution (SAE) network". The combination of an E-UTRAN and an EPC network is referred to as an "Evolved Packet System (EPS)" or an "LTE/SAE network". A base station in an E-UTRAN is called an "E-UTRAN NodeB" ("eNodeB" or "eNB" for short).

There is contemplation of having a base station that provides a coverage area smaller than the coverage area provided by a conventional (i.e. "macro") cellular base station. For example, it is contemplated to have base station that provides a coverage area for a home only or a campus only. Such a base station is referred to herein as a "home base station." Other names for a home base station are "Home E-UTRAN NodeB (HeNB)", "LTE Home Access Point (LTE HAP)", "LTE Femto Access Point (LTE FAP)" and "femto base station". In an UTRAN ("Universal Terrestrial Radio Access Network", also known as 3G) system, a home base station is referred to as a "Home NodeB (HNB)". For simplicity, we shall refer to a "home base station" as an HeNB.

The HeNB is specified to provide essentially the same service to end users as an eNB and would be connected to the core network by, for example, using some kind of Internet Protocol (IP) based transmission. In this document, the coverage area serviced by an HeNB is called a femtocell (it is also sometimes referred to as a picocell when, for example, the coverage area provided by the HeNB encompasses a large office building or campus), and the coverage area serviced by an eNB is called a macrocell. Thus, an HeNB (or other home base station) may be referred to herein as a "femto base station" and an eNB (or other base station that provides a larger coverage area than a femto base station) may be referred to as a "macro base station".

A perceived advantage of an HeNB is that it may be cheaper for an end user to receive a service when using an HeNB for network access versus using an eNB for network access. The HeNB would, in most cases, use the end user's already existing broadband connection (e.g. xDSL, Cable, etc.) to achieve connectivity to an operator's CN and possibly to other eNBs/HeNBs.

The current working assumption in the 3GPP LTE RAN specification is that the "X2 interface" is not used with HeNBs, but the X2 interface is used by eNBs to communicate with each other. The X2 interface between eNBs is used for handover, so called 'X2 based handover' and for Inter-cell Interference Control (ICIC). When an X2 connection is set up between two eNBs, the eNBs exchange information regarding the macrocells served by the eNBs. Typically, an X2 connection is set up only between eNBs that serve cells between which handover may be performed. The protocol used for the X2 control plane is called the "X2 Application Protocol (X2AP)". The X2AP messages used for establishing an X2 connection between two eNBs are X2 SETUP REQUEST and X2 SETUP RESPONSE.

A mobile network may have up to a million or more HeNBs. It is doubtful that the capacity of the control nodes in the CN (e.g. a Mobility Management Entity (MME) or other core network control nodes) will be able to handle that many HeNBs. Therefore, a gateway (a.k.a. a HeNB gateway (HeNB-GW), which is a type of concentrator node) is used to conceal the large number of HeNBs from the CN. That is, the HeNB-GW will, from the perspective of the CN, look like an eNB with many cells. Accordingly, the HeNB-GW communicates with the control nodes of the CN using the "S1 interface" in the same manner that an eNB communicates with the control nodes of the CN using the S1 interface. Functionally, the HeNB-GW acts as a proxy of the CN control node for all the HeNBs that are connected to the HeNB-GW (i.e. from the perspective of an HeNB, the HeNB-GW will look like a CN control node). That is, an HeNB communicates with a HeNB-GW using an S1 interface in the same manner that an eNB communicates with the control nodes of the CN using the S1 interface. In an UTRAN system, the gateway is referred to as a Home NodeB Gateway or HNB-GW.

The number of HeNBs connected to an HeNB-GW may be up to 100,000 or more. Thus, the number of femtocells "served" by an HeNB-GW may be up to 200,000 or more, assuming an HeNB serves up to two femtocells.

There exist two different procedures for performing a handover between eNBs. These are: (1) the "S1 based" handover procedure and (2) the "X2 based" handover procedure. As these names imply, the S1 based handover procedure uses an S1 interface between nodes of the E-UTRAN and the control nodes in the CN, whereas the X2 based handover procedure uses mainly the X2 interface between nodes of the E-UTRAN. The S1 based handover procedure is described in 3GPP TS 23.401, and the X2 based handover procedure is described in 3GPP TS 36.300. Both the S1 based handover procedure and the X2 based handover procedure can be applied to handovers between HeNBs. However, the latter only in case the X2 interface is used.

A problem with using the S1 based handover procedures to transfer a connection from a source HeNB to a target HeNB is that the S1 based handover procedure requires signaling towards a core network control node. Because it is expected that the RAN will include a large number of HeNBs, it is expected that there will be a large number of handovers between HeNBs in, for example, an enterprise or campus scenario. Consequently, using the S1 based handover procedure in the femto environment may significantly increase the signaling load seen by the core network control nodes. The X2 based handover procedure can decrease this signaling load, but this would require that the HeNBs implement at least some aspects of an X2 protocol, which would increase the cost and complexity of the HeNBs. Because HeNBs are expected to be mass-market devices, it is desired to keep HeNBs as simple and cheap as possible.

What is desired is an improved handover procedure.

SUMMARY

In one aspect, the present invention provides an improved method for handing over a connection from a source base station (e.g., an HeNB) to a target base station (e.g., another HeNB). In some embodiments, the method is performed by a gateway (e.g., HeNB-GW, HNB-GW, or other gateway) that acts as a proxy of a core network control node for a plurality of base stations that are connected to the gateway. In some embodiments, the gateway is operable to receive a handover required message (e.g. the S1AP HANDOVER REQUIRED message) transmitted from the source base station. This handover required message indicates that a user equipment (UE) connection serviced by the source base station should be handed over to a target base station. In response to receiving the handover required message, the gateway generates a handover request message (e.g., the S1AP HANDOVER REQUEST message) and transmits to the target base station the handover request message.

Advantageously, in response to receiving the handover required message transmitted from the source base station, the gateway does not transmit any handover message to any core network control node (assuming the gateway can communicate directly with the target base station). In this manner, the method provides the distinct advantage of reducing the signaling load seen by the core network control nodes (e.g., MMEs) while at the same time not requiring the HeNBs to implement any portion of the X2 protocol.

In some embodiments, after transmitting the handover request message to the target base station, the gateway may receive from the target base station an acknowledgement message (e.g., the S1AP HANDOVER REQUEST ACKNOWLEDGE message). In response to the acknowledgement message, the gateway transmits a handover command message (e.g., the S1AP HANDOVER COMMAND message) to the source base station.

In some embodiments, step of transmitting the handover request message to the target base station comprises transmitting the handover request message over an existing interface set up between the gateway and the target base station.

In some embodiments, the method also includes the steps of: (e) receiving, at the gateway, a handover notify message transmitted from the target base station in response to the target base station receiving a handover confirmation message transmitted from the UE; (f) generating, at the gateway, a path switch request message in response to receiving at the gateway the handover notify message; (g) transmitting, from the gateway, the path switch request message to a core network node (e.g. MME or another core network control node); (h) receiving, at the gateway, a path switch request acknowledge message transmitted from the core network control node; (i) generating, at the gateway, a UE context release command message in response to receiving the path switch request acknowledge message; (j) transmitting, from the gateway, the UE context release command message to the source base station; and (k) receiving, at the gateway, a UE context release complete message transmitted from the source base station. The source base station is configured to transmit a handover command to the UE in response to receiving the handover command transmitted from the gateway.

In some embodiments, the gateway, in direct response to receiving the handover required message, determines whether there exists a connection with the target base station and, if a connection is determined to exist, then the gateway generates the handover request message and transmits the handover request message to the target base station via the connection, otherwise the gateway forwards the handover required message to a core network node.

In some embodiments, the step of generating the handover request message comprises one or more of the following steps: (i) extracting certain information from the handover required message and including the extracted information in the handover request message; (ii) retrieving previously stored information that was included in one or more control messages (e.g. an S1AP INITIAL CONTEXT SETUP REQUEST message) previously received at the gateway, wherein the control messages relates to a connection established with the UE, and including the retrieved information in the handover request message; (iii) mapping information included in the handover required message to information required to be included in the handover request message; and (iv) adding to the handover request message one or more predetermined default values.

In another aspect, the present invention provides a gateway apparatus for facilitating the handover of a connection from a source base station to a target base station. In some embodiments, the gateway apparatus includes the following: a data storage system storing computer software; a data processing system for executing the computer software; and a transmit and receive module for (a) receiving messages transmitted from the source base station such as a handover required message that indicates that a user equipment (UE) serviced by the source base station should be handed over to the target base station and (b) transmitting messages. Advantageously, the computer software is configured such that when the computer software is executed by the data processing system, the data processing system, in response to receiving the handover required message, uses the transmit and receive module to transmit to the target base station a handover request message that was generated by the processing system if the processing system is capable of communicating with the target network node, and is further configured such that when the computer software is executed by the data processing system, the data processing system is operable to function as a proxy of a core network control node for a plurality of base stations that are communicatively connected to the gateway apparatus.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

The present invention will be described herein in the context of an LTE/SAE network, but the invention is not so limited (i.e. the invention could also apply to other networks such as a 3G network).

Figure 1:
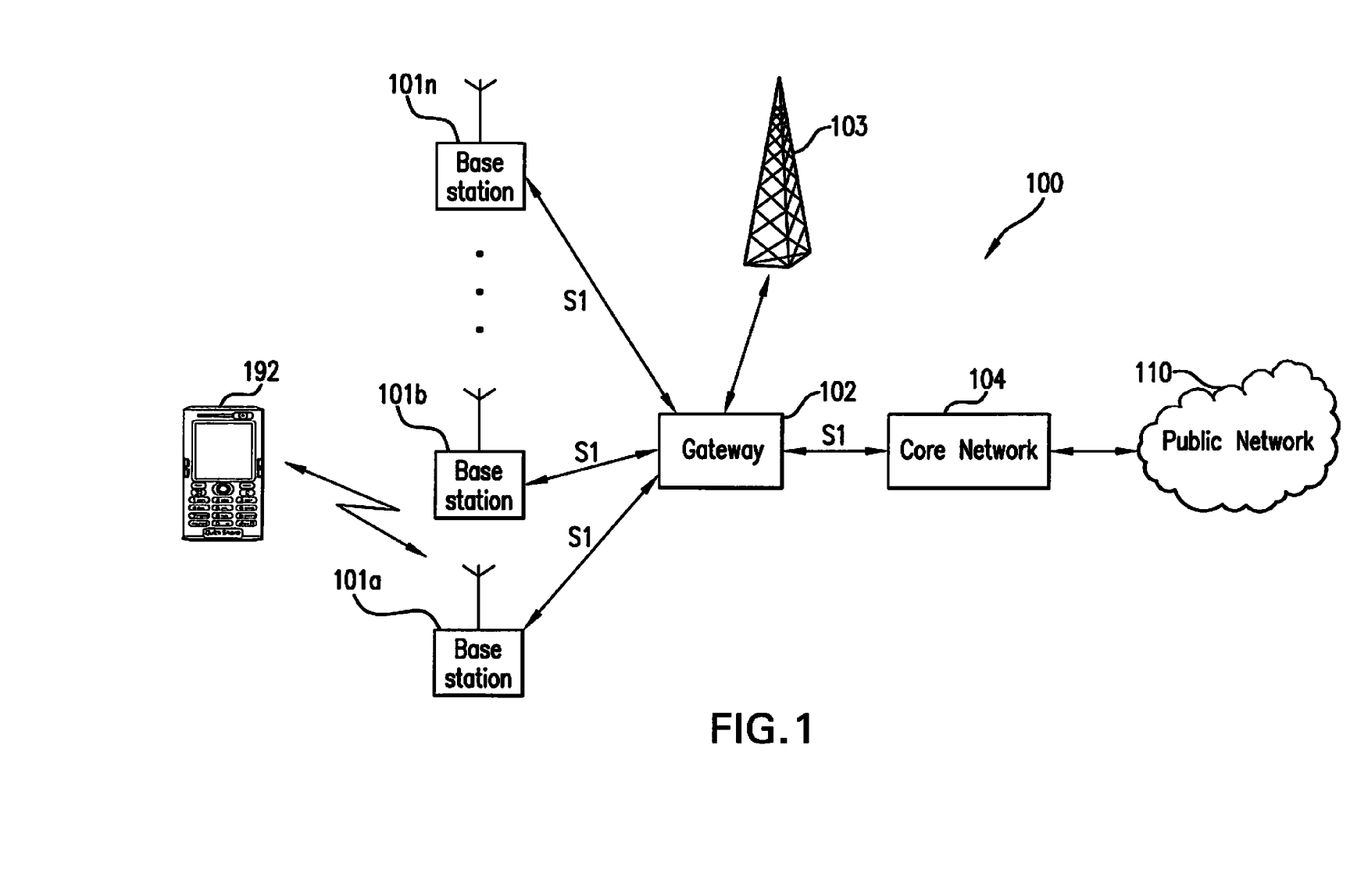
FIG. 1 illustrates a network according to an embodiment of the invention.

Referring now to FIG. 1, FIG. 1 illustrates a wireless communication system 100 according to an embodiment of the invention. As shown, system 100 includes a plurality of network nodes 101 (e.g. base stations 101a, 101b, . . . , 101n) serving femtocells, a gateway 102 (e.g., a HeNB-GW or HNB-GW), and a CN 104 having at least one control node (e.g. MME 392 (see FIG. 3)). These components enable a user of user equipment (UE) 192 to communicate with other devices and systems (e.g. other devices and systems connected to public network 110). System 100 may also include one or more eNBs 103 serving macrocells.

An aspect of the present invention provides an improved gateway 102 that is configured to implement an improved handover procedure. In some embodiments, gateway 102 enables a UE 192 connection to be handed over from a source network node 101a to target network node 101b without the source network node having to communicate with a control node in the core network 104 (e.g. an MME) (e.g. the S1AP HANDOVER REQUIRED message as defined in 3GPP TS 36.413 sent from the source network node need not be received by the MME in order for the handover procedure to complete successfully).

For example, in some embodiments, the gateway is configured to: (a) intercept a handover required message transmitted from the source base station (the handover required message indicates that a user equipment (UE) serviced by the source base station should be handed over to the target base station), (b) in response, generate and transmit a handover request message to the target base station, (c) receive an acknowledgement message from the target base station, and (d) in response to the acknowledgement message, transmit a handover command message to the source base station. Advantageously, in response to receiving the handover required message transmitted from the source base station, the gateway does not transmit any handover message to any core network control node (assuming the gateway can communicate directly with the target base station). In this manner, the method provides the distinct advantage of reducing the signaling load seen by the core network control nodes (e.g., MMEs) while at the same time not requiring the source base station be able to communicate directly with the target base station. The gateway may communicate with the source base station using an interface between the gateway and source base station. Likewise, the gateway may communicate with the target base station using an interface between the gateway and target base station. This interface between the gateway and target base station may have been established previously, or it could be set up when required, i.e. as part of the handover procedure described above. Although the following description will refer to the S1AP interface and related messages to exemplify some embodiments of the present solution, the handover process may also be implemented using another type of interface between the gateway and target base station and gateway and source base station.

Figure 2:
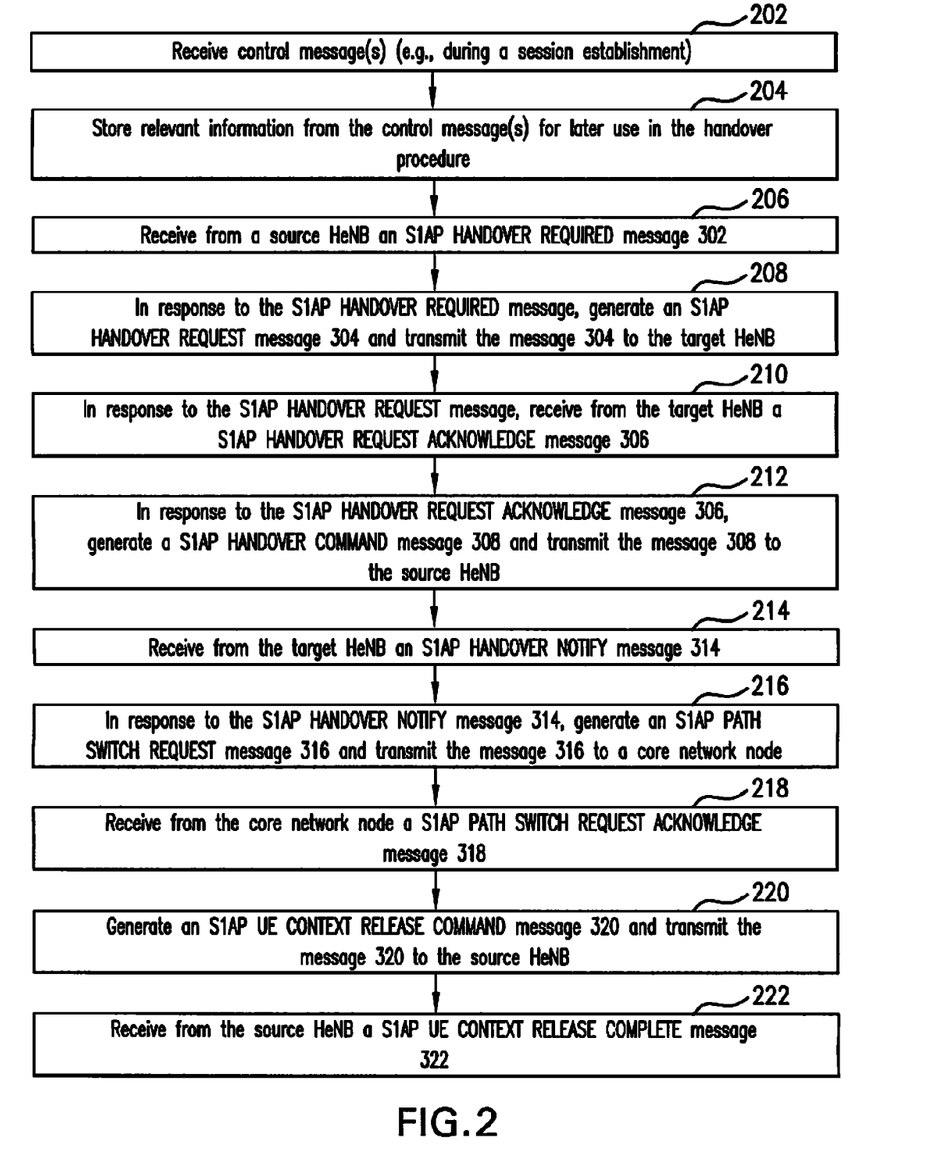
FIG. 2 is a flow chart illustrating a process according to an embodiment of the invention.

Referring now to FIG. 2, FIG. 2 is a flow chart illustrating one specific process 200 that is performed by gateway 102 to implement the process described above. Process 200 may begin in step 202, where gateway 102 receives one or more control messages. For example, in step 202 gateway 102 may receive one or more control messages from a source network node (e.g. HeNB 101a) or from the core network 104 as part of a procedure for establishing a session with UE 192 or one or more control messages related to a handover of a UE 192 session to the source network node. For instance, gateway 102 may receive S1AP protocol control messages from the source network node 101a or a core network 104 node, such as, for example, the S1AP INITIAL CONTEXT SETUP REQUEST message and the S1AP E-RAB SETUP/MODIFY REQUEST message(s). Likewise, in step 202, gateway 102 may receive X2AP handover related messages from an eNB 103. Next (step 204), gateway 102 stores relevant information (e.g. relevant information elements (IEs) or portions of relevant IEs) contained in the above mentioned S1AP/X2AP messages for later use during a handover procedure.

Next (step 206), gateway 102 receives from the source network node a handover required message 302 (e.g. the S1AP HANDOVER REQUIRED message) (see FIG. 3, which shows a message flow according to an embodiment of the invention), which identifies or contains information for identifying a target network node (e.g. HeNB 101b). Message 302 includes a set of IEs. Typically, one or more measurement report messages 301 (e.g. the RRC MeasurementReport message as defined in 3GPP TS 36.331 containing one or more handover candidates) transmitted to the source HeNB 101a from the UE 192 triggers the source HeNB 101a to begin the handover process (i.e. causes the source HeNB 101 to make a handover decision and to transmit a handover request message 302).

In direct response to receiving message 302, gateway 102 may determine whether there exists an S1 interface towards the target network node. This determination is based on the S1 setup performed between the target network node and the gateway 102 as during this S1 setup the target network node sends its identity, eNB-ID, to the gateway 102. As the current definition is that the eNB-ID is included in the Cell Identity, this means that the gateway 102 will know the eNB-ID of the HeNBs connected to it (at least in the case when each HeNB serves a single femtocell). If gateway 102 determines that there exists an S1 interface towards the target network node, then the process proceeds to step 208.

In step 208, gateway 102, rather than simply retransmitting message 302 to a control node within CN 104, (1) generates a handover request message 304 (e.g. the S1AP HANDOVER REQUEST message) in response to receiving message 302 and detecting that gateway 102 has an S1 interface with the target network node and (2) transmits the message 304 to the target network node.

The S1AP HANDOVER REQUEST message 304 requires a particular set of IEs. Referring now Table 1 shown below, Table 1 shows a list of at least some of the IEs that are required to be included in the S1AP HANDOVER REQUEST message 304.

TABLE 1

| IEs in S1AP HANDOVER REQUEST | Exemplary source for the information |
| --- | --- |
| Message Type | Defined in 3GPP TS 36.413 |
| MME UE S1AP ID | Included in the S1AP INITIAL CONTEXT SETUP REQUEST message. |
| Handover Type | Use predetermined default (e.g. "IntraLTE"). |
| Cause | Use Cause value from the S1AP HANDOVER REQUIRED message |

TABLE 1-continued

| IEs in S1AP HANDOVER REQUEST | Exemplary source for the information |
|---|---|
| UE Aggregate Maximum Bit Rate | Included in the S1AP INITIAL CONTEXT SETUP REQUEST or E-RAB SETUP/MODIFY REQUEST messages. |
| E-RAB ID (E-RABs to be set up) | Included in the S1AP HANDOVER REQUIRED message |
| Transport Layer Address | Included in the S1AP INITIAL CONTEXT SETUP REQUEST message for the default E-RAB or in the S1AP E-RAB SETUP/MODIFY REQUEST message(s) for any other E-RABs. |
| GTP TEID | Included in the S1AP INITIAL CONTEXT SETUP REQUEST message for the default E-RAB or in the S1AP E-RAB SETUP/MODIFY REQUEST message(s) for any other E-RABs. |
| E-RAB Level QoS Parameters | Included in the S1AP INITIAL CONTEXT SETUP REQUEST message for the default E-RAB or in the S1AP E-RAB SETUP/MODIFY REQUEST message(s) for any other E-RABs. |
| Source eNB to Target eNB Transparent Container | Included in the S1AP HANDOVER REQUIRED message. |
| Handover Restriction List | This optional IE can be transferred from the MME to the HeNB in many different messages and the HeNB-GW can store the information. One example is the S1AP INITIAL CONTEXT SETUP REQUEST message. |
| Trace Activation | This optional IE can be transferred from the MME to the HeNB in many different messages and the HeNB-GW can store the information. One example is the S1AP INITIAL CONTEXT SETUP REQUEST message. |
| Request Type | This optional IE can be transferred from the MME to the HeNB for example in the S1AP LOCATION REPORTING CONTROL message and the HeNB-GW can store the information. |

As indicated in Table 1, some of the information that is required to be included in the S1AP HANDOVER REQUEST message 304 is: (a) included in the S1AP HANDOVER REQUIRED message 302, (b) included in messages received in step 202, and/or (c) previously generated or allocated by gateway 102. Accordingly, in some embodiments, gateway 102 generates the S1AP HANDOVER REQUEST message 304 by: (i) extracting certain information from the S1AP HANDOVER REQUIRED message 302, (ii) retrieving information that was stored in step 204, (iii) retrieving previously allocated information (default values), and/or (iv) mapping information included in the S1AP HANDOVER REQUIRED message 302 to information required to be included in S1AP HANDOVER REQUEST message 304. Table 1 illustrates the case when the signaling connection and related bearers are activated in the source network node so that the gateway 102 is able to see the related S1AP signaling and store the values needed for a later handover logic. Similar principles can also be applied in other cases (e.g. in the case where the signaling connection and related bearers were initially established in an eNB and the gateway 102 was not able to see the related S1AP signaling). In such a case, the X2AP or S1AP signaling related to the handover from the eNB to the source network node will contain the needed information and can be stored by gateway 102 for a later handover from the source network node to another network node. This same principle applies for all the handover logic described herein.

In other words, the following are some different possibilities on how the required information can be found: (1) gateway 102 keeps state and related information from a previous signaling related to the signaling connection (and the associated bearers) that is to be handed over (e.g. during Initial Context Setup or E-RAB Setup/Modify or previous handover into HeNB, via the HeNB-GW); (2) gateway 102 copies the information from the message triggering the handover procedure (e.g. the S1AP HANDOVER REQUIRED message) to the S1AP HANDOVER REQUEST message; (3) gateway 102 keeps state and related information during the handover preparation to handover execution (e.g. from the $1^{st}$ message to the $3^{rd}$ message and one example is that information is stored in the HeNB-GW from S1AP HANDOVER REQUIRED message and then used in the S1AP HANDOVER COMMAND message); and (4) gateway 102 uses default values for some of the IEs. As part of the handover process, the source and target network nodes may send messages to inform about the status of received user data (e.g. for S1 the S1AP eNB STATUS TRANSFER message and the MME STATUS TRANSFER message depending on sending entity). These messages are not shown in the message flow shown in FIG. 3, nor are the mapping tables shown, but it's a direct copying of information, except for the connection identifiers (i.e. MME UE S1AP ID and eNB UE S1AP ID which needs to be replaced with the ones related to the connection).

Figure 3:
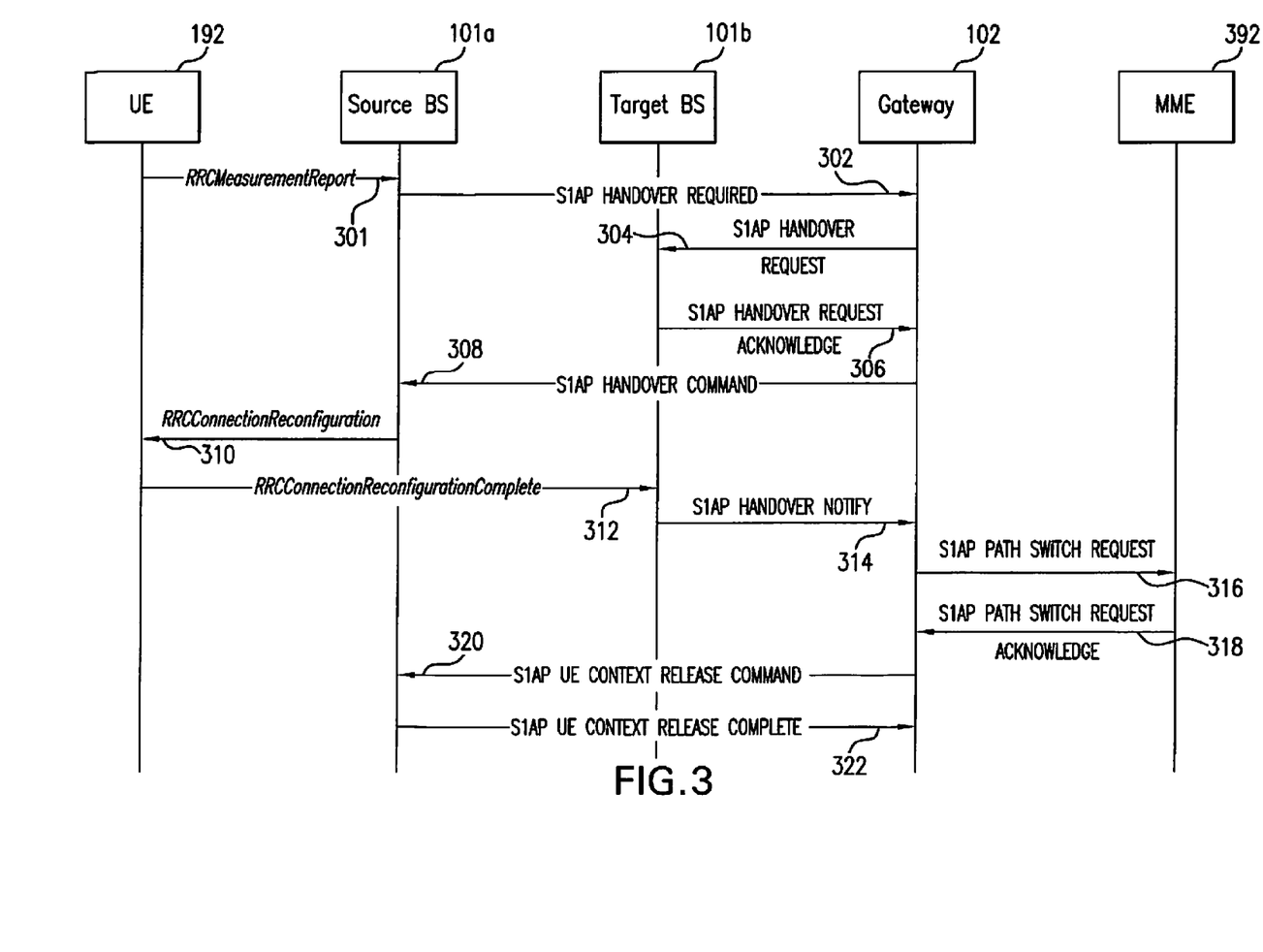
FIG. 3 is a message flow diagram further illustrating the process shown in FIG. 2.

Next (step 210), gateway 102 receives from the target network node an acknowledge message 306 (e.g. an S1AP HANDOVER REQUEST ACKNOWLEDGE message), which was transmitted by the target network node in response to message 304. In response to the acknowledge message 306, gateway 102 determines whether the acknowledge message 306 was transmitted in response to message 304. If it was, the process proceeds to step 212. In step 212, gateway 102 generates a handover command message 308 (e.g. the S1AP HANDOVER COMMAND message) and transmit the message 308 to the source network node.

The S1AP HANDOVER COMMAND message 308 requires a particular set of IEs. Referring now to Table 2 shown below, Table 2 shows a list of at least some of the IEs that are required to be included in S1AP HANDOVER COMMAND message 308.

TABLE 2

| The IEs in S1AP HANDOVER COMMAND | Exemplary source for the information |
|---|---|
| Message Type | Defined in 3GPP TS 36.413 |
| MME UE S1AP ID | May be obtained by the HeNB-GW during earlier S1AP signaling. |
| eNB UE S1AP ID | May be obtained by the HeNB-GW during earlier S1AP signaling. |
| Handover Type | Use default (e.g. "IntraLTE"). |
| E-RAB ID (E-RABs to be forwarded) | If this optional IE received in the HeNB-GW in the S1AP HANDOVER REQUEST ACKNOWLEDGE message in the E-RABs Admitted List |
| DL Transport Layer Address | If this optional IE received in the HeNB-GW in the S1AP HANDOVER REQUEST ACKNOWLEDGE message in the E-RABs Admitted List |
| DL GTP TEID | If this optional IE received in the HeNB-GW in the S1AP HANDOVER REQUEST ACKNOWLEDGE message in the E-RABs Admitted List |
| E-RAB ID (E-RABs to be releasd) | If this optional IE received in the HeNB-GW in the S1AP HANDOVER REQUEST ACKNOWLEDGE message in the E-RABs Failed to Setup List |
| Target eNB to Source eNB Transparent Container | May be obtained by the HeNB-GW from the S1AP HANDOVER REQUEST ACKNOWLEDGE message. |

TABLE 2-continued

| The IEs in S1AP HANDOVER COMMAND | Exemplary source for the information |
|---|---|
| Criticality Diagnostics | If this optional IE received in the HeNB-GW in the S1AP HANDOVER REQUEST ACKNOWLEDGE message in the Criticality Diagnostics IE. |

As indicated in Table 2, some of the IEs that are required to be included in the S1AP HANDOVER COMMAND message 308 are: (a) included in the S1AP HANDOVER REQUEST ACKNOWLEDGE message 306 or (b) included in messages received in step 202. Accordingly, in some embodiments, gateway 102 generates the S1AP HANDOVER COMMAND message 308 by: (i) extracting certain information from the S1AP HANDOVER REQUEST ACKNOWLEDGE message 306, (ii) retrieving information stored in step 204 and (iii) retrieving previously allocated information (default values).

In response to the S1AP HANDOVER COMMAND message 308, the source network node transmits a handover command message 310 (e.g. the RRC RRCConnectionReconfiguration message) to the UE 192. In response to the handover command message 310, the UE 192 transmits a handover confirmation message 312 (e.g. the RRC RRCConnectionReconfigurationComplete message) to the target network node, which then transmits to gateway 102 an handover notify message 314 (e.g. the S1AP HANDOVER NOTIFY message).

In step 214, gateway 102 receives the handover notify message 314 and determines whether message 314 relates to message 306. As gateway 102 has so far hidden the ongoing handover from the core network 104 control node, gateway 102 needs to update the core network control node about the performed handover. This is accomplished by generating an S1AP PATH SWITCH REQUEST message 316 and sending message 316 towards the core network 104 (e.g. an MME in the core network) (this message is normally only used for X2-based handover) (step 216). Gateway 102 finds the information needed for the message 316 using the principles disclosed above. That is, gateway 102 uses previously stored, generated and/or received information, as described herein, to generate message 316.

Referring now to Table 3 shown below, Table 3 shows a list of at least some of the IEs that are required to be included in the S1AP PATH SWITCH REQUEST message 316.

TABLE 3

| The IEs in S1AP PATH SWITCH REQUEST | Exemplary source for the information |
|---|---|
| Message Type | Defined in 3GPP TS 36.413 |
| eNB UE S1AP ID | May be obtained by the HeNB-GW during earlier S1AP signaling. |
| E-RAB ID (E-RABs to be switched) | May be obtained by the HeNB-GW during earlier S1AP signaling e.g. may be received in the HeNB-GW in the S1AP HANDOVER REQUEST ACKNOWLEDGE message in the E-RABs Admitted List IE. |
| Transport layer address | May be obtained by the HeNB-GW during earlier S1AP signaling e.g. may be received in the HeNB-GW in the S1AP HANDOVER REQUEST ACKNOWLEDGE message in the E-RABs Admitted List IE. |
| GTP TEID | May be obtained by the HeNB-GW during earlier S1AP signaling e.g. may be received in the HeNB-GW in the S1AP HANDOVER REQUEST ACKNOWLEDGE message in the E-RABs Admitted List IE. |
| Source MME UE S1AP ID | May be obtained by the HeNB-GW during earlier S1AP signaling. |
| E-UTRAN CGI | May be obtained by the HeNB-GW during earlier S1AP signaling e.g. in the S1AP HANDOVER REQUIRED message and the Source eNB to Target eNB Transparent Container IE. |

As indicated in Table 3, some of the IEs that are required to be included in the S1AP PATH SWITCH REQUEST message 312 are: (a) included in the S1AP HANDOVER REQUIRED message 302, (b) included in the S1AP HANDOVER REQUEST ACKNOWLEDGE message 306, or (c) included in messages received in step 202. Accordingly, in some embodiments, gateway 102 generates the S1AP PATH SWITCH REQUEST message 312 by: (i) extracting certain information from messages 302 and 306 and/or (ii) retrieving information stored in step 204.

Next (step 218), gateway 102 receives from the core network (e.g. from the MME) an S1AP PATH SWITCH REQUEST ACKNOWLEDGE message 318.

In step 220, gateway 102 generates an S1AP UE CONTEXT RELEASE COMMAND message 320 and transmits it to the source network node thereby triggering the release of resource in the source network node. Gateway 102 finds the IEs needed for the message 320 using the principles disclosed above. That is, gateway 102 uses previously stored, generated and/or received information, as described herein, to generate message 320. In step 222, gateway 102 receives from the source network node an S1AP UE CONTEXT RELEASE COMPLETE message 322.

It should be noted that FIG. 3 is simplified in the sense that neither an MME nor a Serving GW is reallocated in these figures. The reallocation of these nodes doesn't contain any HeNB specific signaling. The details of forwarding of user data are also not shown as these are not important for these flows (i.e. there are no significant differences towards the well-known signaling flows).

A benefit of configuring gateway 102 to perform process 200 is that it results in less signaling load toward the core network control node.

Figure 4:
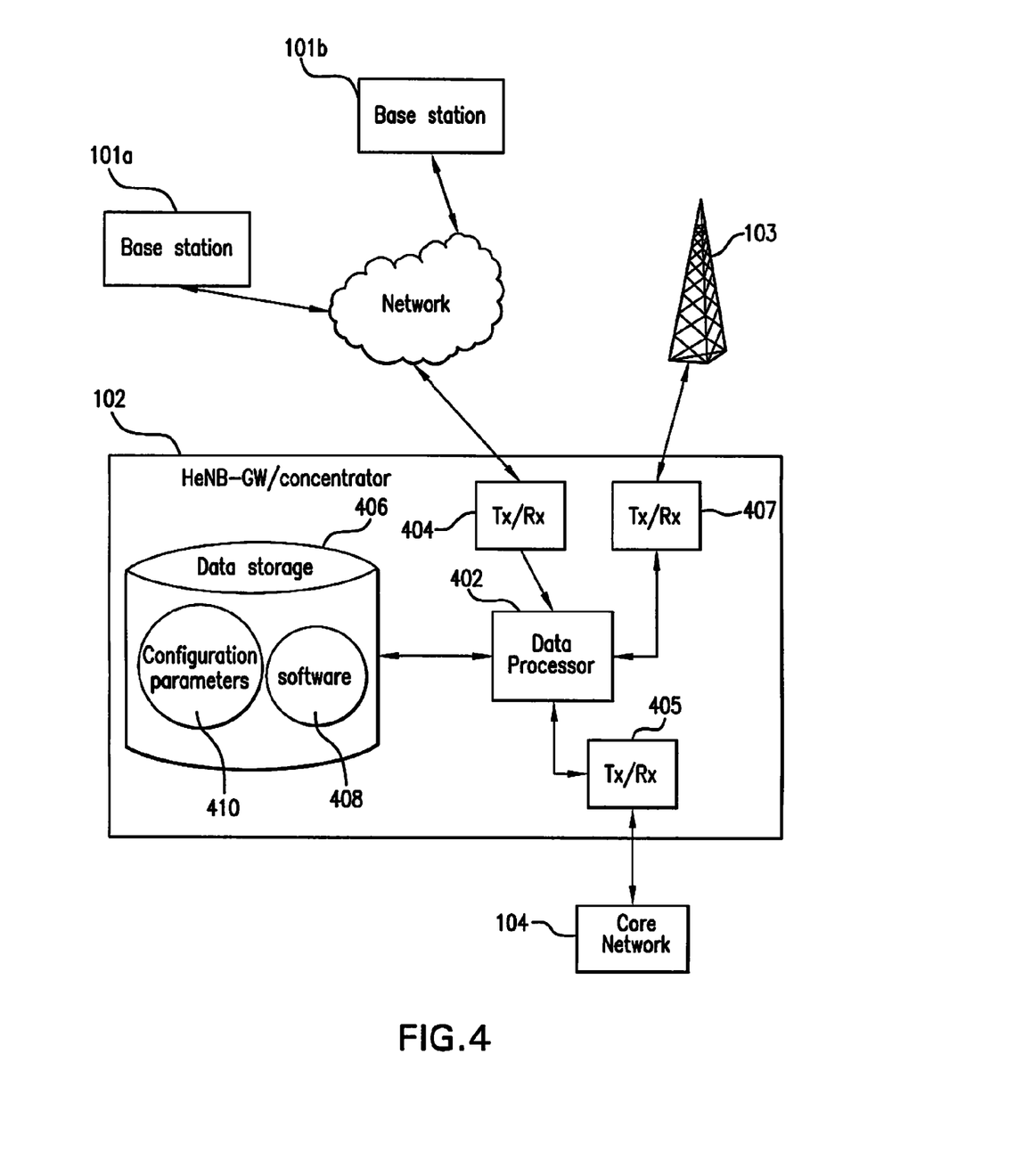
FIG. 4 is a functional block diagram of a gateway according to an embodiment of the invention.

Referring now to FIG. 4, FIG. 4 is a functional block diagram of gateway 102 according to some embodiments of the invention. As shown, gateway 102 may comprise a data processing system 402 (e.g. one or more microprocessors), a data storage system 406 (e.g. one or more non-volatile storage devices) and computer software 408 stored on the storage system 406. Configuration parameters 410 may also be stored in storage system 406. Gateway 102 may also include transmit/receive (Tx/Rx) circuitry for communicating with eNBs 103, HeNBs 101 and CN 104. For example, gateway 102 may include Tx/Rx module 404 for transmitting data to and receiving data from HeNBs 101, Tx/Rx module 405 for transmitting data to and receiving data from, for example, core network 104, and Tx/Rx module 407 for transmitting data to and receiving data from eNBs 103. Software 408 is configured such that when processing system 402 executes software 408, gateway 102 performs steps described above with reference to the flow charts shown in FIG. 2. That is, for example, software 408 may include a module for generating an S1AP HANDOVER REQUEST message in response to gateway 102 receiving from an HeNB an S1AP HANDOVER REQUIRED message that identifies another HeNB as the target of the handover.

While various embodiments of the present invention have been described above, it should be understood that they have been presented by way of example only, and not limitation. For example, the embodiments apply also in other cases than in a system consisting of HeNBs and HeNB-GW. One such example would be solution where a base station gateway is used between one or more base stations and the core network and when the same or similar interface is used on both sides of the base station gateway. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for handing over a connection from a source base station to a target base station, the method comprising:
    receiving, at a gateway, a handover required message transmitted from the source base station, the handover required message indicating that a user equipment connection serviced by the source base station should be handed over to a target base station;
    generating, at the gateway, a handover request message in response to receiving the handover required message; and
    transmitting, from the gateway, to the target base station the handover request message,
    wherein the gateway acts as a proxy of a core network control node for a plurality of base stations that are connected to the gateway.

2. The method of claim 1, wherein transmitting the handover request message to the target base station comprises transmitting the handover request message over an existing interface set up between the gateway and the target base station.

3. The method of claim 1:
    wherein the handover required message is an S1AP HANDOVER REQUIRED message, and
    wherein the handover request message is an S1AP HANDOVER REQUEST message.

4. The method of claim 1, further comprising:
    receiving, at the gateway, a handover request acknowledge message transmitted from the target base station;
    generating, at the gateway, a handover command message in response to receiving at the gateway the handover request acknowledge message; and
    transmitting, from the gateway, the handover command message to the source base station.

5. The method of claim 1, further comprising:
    receiving, at the gateway, a handover notify message transmitted from the target base station in response to the target base station receiving a handover confirmation message transmitted from the user equipment;
    generating, at the gateway, a path switch request message in response to receiving at the gateway the handover notify message;
    transmitting, from the gateway, the path switch request message to a core network control node.

6. The method of claim 5, wherein the core network control node is a Mobility Management Entity.

7. The method of claim 5, further comprising:
    receiving, at the gateway, a path switch request acknowledge message transmitted from the core network control node;
    generating, at the gateway, a user equipment context release command message in response to receiving the path switch request acknowledge message; and
    transmitting, from the gateway, the user equipment context release command message to the source base station.

8. The method of claim 7, further comprising receiving, at the gateway, a user equipment context release complete message transmitted from the source base station.

9. The method of claim 4, wherein the source base station is configured to transmit a handover command message to the user equipment in response to receiving the handover command message transmitted from the gateway.

10. The method of claim 1, wherein, in response to receiving the handover required message transmitted from the source base station, the gateway does not transmit any handover message to any core network control node.

11. The method of claim 1:
    wherein, in direct response to receiving the handover required message, the gateway determines whether there exists a connection with the target base station;
    wherein if the connection is determined to exist, the gateway generates the handover request message and transmits the handover request message to the target base station via the connection; and
    wherein if the connection is determined not to exist the gateway forwards the handover required message to a core network node.

12. The method of claim 1, wherein the step of generating the handover request message comprises at least one of:
    extracting certain information from the handover required message and including the extracted information in the handover request message;
    retrieving previously stored information that was included in at least one control message previously received at the gateway, wherein the at least one control message relates to a connection established with the user equipment, and includes the retrieved information in the handover request message;
    mapping information included in the handover required message to information required to be included in the handover request message; and
    adding to the handover request message at least one pre-determined default value.

13. The method of claim 12, wherein at least one of the at least one control messages is the S1AP INITIAL CONTEXT SETUP REQUEST message.

14. The method of claim 1, wherein the source base station is a femto base station and the target base station is a femto base station.

15. A gateway apparatus for facilitating the handover of a connection from a source base station to a target base station, the gateway apparatus comprising:
    a data storage system configured to store computer software;
    a data processing system configured to execute the computer software;
    a first transmit and receive module configured to receive messages transmitted from the source base station such as a handover required message that indicates that a user equipment connection serviced by the source base station should be handed over to the target base station and to transmit messages; and a second transmit and receive module configured to transmit messages to a core network control node and to receive messages from the core network control node, wherein the computer software is configured such that when the computer software is executed by the data processing system, the data processing system, in response to receiving the handover required message, uses the transmit and receive module to transmit to the target base station a handover request message that was generated by the processing system if the processing system is capable of communicating with the target network node; and wherein the computer software is further configured such that when the computer software is executed by the data processing system, the data processing system is operable to function as a proxy of a core network control node for a plurality of base stations that are communicatively connected to the gateway apparatus.

16. The gateway apparatus of claim 15, wherein the data processing system uses the first transmit and receive module to transmit the handover request message to the target base station over an existing interface set up between the gateway apparatus and the target base station.

17. The gateway apparatus of claim 15:
wherein the handover required message is an S1AP HANDOVER REQUIRED message, and
wherein the handover request message is an S1AP HANDOVER REQUEST message.

18. The gateway apparatus of claim 15, wherein the computer software is further configured such that when the computer software is executed by the data processing system, the data processing system, in response to receiving a handover request acknowledge message-transmitted from the target base station, generates a handover command message and uses the first transmit and receive module to transmit the handover command message to the source base station.

19. The gateway apparatus of claim 15, wherein the computer software is further configured such that when the computer software is executed by the data processing system, the data processing system, in response to receiving a handover notify message transmitted from the target base station in response to the target base station receiving a handover confirmation message transmitted from the user equipment, generates a path switch request message and uses the second transmit and receive module to transmit the path switch request message to the core network node.

20. The gateway apparatus of claim 19, wherein the core network node is a Mobility Management Entity.

21. The gateway apparatus of claim 19, wherein the computer software is further configured such that when the computer software is executed by the data processing system, the data processing system, in response to receiving a path switch request acknowledge message transmitted from the core network node, generates a user equipment context release command message and uses the first transmit and receive module to transmit the user equipment context release command message to the source base station.

22. The gateway apparatus of claim 18, wherein the source base station is configured to transmit a handover command message to the user equipment in response to receiving the handover command transmitted from the gateway.

23. The gateway apparatus of claim 15, wherein, the gateway apparatus is configured such that, in response to receiving the handover required message transmitted from the source base station, the gateway apparatus does not transmit any handover message to any core network control node.

24. The gateway apparatus of claim 15:
wherein the computer software is configured such that when the computer software is executed by the data processing system, the data processing system, in direct response to receiving the handover required message, determines whether there exists a connection with the target base station;
wherein if the connection is determined to exist, the handover request message is generated and transmitted to the target base station via the connection; and
wherein if the connection is determined not to exist, the handover required message is forwarded-to a core network node.

25. The gateway apparatus of claim 15, wherein the computer software is configured such that when the computer software is executed by the data processing system, the data processing system generates the handover request message by:
extracting certain information from the handover required message and including the extracted information in the handover request message;
retrieving previously stored information that was included in at least one control message previously received at the gateway,
wherein the at least one control message relates to a connection established with the user equipment, and includes the retrieved information in the handover request message;
mapping information included in the handover required message to information required to be included in the handover request message; and/or
adding to the handover request message predetermined default values.

26. The gateway apparatus of claim 25, wherein the at least one control message is the S1AP INITIAL CONTEXT SETUP REQUEST message.

27. The gateway apparatus of claim 15, wherein the source base station is a femto base station and the target base station is a femto base station.

* * * * *

UNITED STATES PATENT AND TRADEMARK OFFICE
CERTIFICATE OF CORRECTION

PATENT NO. : 8,532,661 B2  
APPLICATION NO. : 13/130079  
DATED : September 10, 2013  
INVENTOR(S) : Vikberg et al.

Page 1 of 1

It is certified that error appears in the above-identified patent and that said Letters Patent is hereby corrected as shown below:

On Title Page 2, in Item (56), under "OTHER PUBLICATIONS", in Column 1, Line 4, delete "Frane," and insert -- France, --, therefor.

On Title Page 2, in Item (56), under "OTHER PUBLICATIONS", in Column 1, Line 5, delete "Sorrenta," and insert -- Sorrento, --, therefor.

In the Specification

In Column 1, Line 19, delete "TECHNICAL FIELD" and insert -- FIELD --, therefor.

In Column 1, Line 51, delete "("Universial" and insert -- ("Universal --, therefor.

In the Claims

In Column 13, Line 33, in Claim 18, delete "message-transmitted" and insert -- message transmitted --, therefor.

In Column 14, Line 25, in Claim 24, delete "forwarded-to" and insert -- forwarded to --, therefor.

Signed and Sealed this  
Third Day of December, 2013

Margaret A. Focarino  
*Commissioner for Patents of the United States Patent and Trademark Office*